(12) United States Patent
Aizawa

(10) Patent No.: US 10,637,019 B2
(45) Date of Patent: Apr. 28, 2020

(54) CELL MODULE

(71) Applicant: VEHICLE ENERGY JAPAN INC., Hitachinaka-shi, Ibaraki-ken (JP)

(72) Inventor: Yasuyuki Aizawa, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 80 days.

(21) Appl. No.: 15/572,235

(22) PCT Filed: Jun. 22, 2016

(86) PCT No.: PCT/JP2016/068453
§ 371 (c)(1),
(2) Date: Nov. 7, 2017

(87) PCT Pub. No.: WO2017/006763
PCT Pub. Date: Jan. 12, 2017

(65) Prior Publication Data
US 2018/0151859 A1    May 31, 2018

(30) Foreign Application Priority Data
Jul. 9, 2015    (JP) .................................. 2015-137648

(51) Int. Cl.
*H01M 2/10*    (2006.01)
*H01M 2/12*    (2006.01)
*H01M 2/20*    (2006.01)

(52) U.S. Cl.
CPC ....... *H01M 2/1077* (2013.01); *H01M 2/1235* (2013.01); *H01M 2/206* (2013.01)

(58) Field of Classification Search
None
See application file for complete search history.

(56) References Cited

U.S. PATENT DOCUMENTS

2014/0023893 A1    1/2014  Shimizu et al.
2015/0069829 A1    3/2015  Dulle et al.
(Continued)

FOREIGN PATENT DOCUMENTS

CN    201531490 U    7/2010
CN    103380512 A    10/2013
(Continued)

OTHER PUBLICATIONS

European Search Report issued in corresponding European Patent Application No. 16821233.0 dated Feb. 22, 2019.
(Continued)

*Primary Examiner* — Haroon S. Sheikh
(74) *Attorney, Agent, or Firm* — Foley & Lardner LLP

(57) ABSTRACT

Provided is a battery module having a structure with which dimensional errors of assembly components can be absorbed for reliable locking and assembling. A battery module 1 according to the present invention is configured so that a plurality of battery cells 2 are arranged, and a bus bar 16 conductively connects adjacent external terminals 13A and 13B, and the battery module 1 includes a cell holder 21 interposed between the plurality of battery cells 2 to hold the battery cells 2, and a bus bar holder 6 mounted to the cell holder 21 to hold the bus bar 16. Then, a bus bar holder locking portion 26 provided at the cell holder 21 and having a hook shape, and a cell holder locking portion 32 provided at the bus bar holder 6 and having a hook shape are locked to each other.

9 Claims, 14 Drawing Sheets

(56) References Cited

U.S. PATENT DOCUMENTS

| | | | | |
|---|---|---|---|---|
| 2015/0295280 A1* | 10/2015 | Cho | ............... | H01M 10/425 |
| | | | | 429/158 |
| 2015/0333304 A1* | 11/2015 | Sekine | ............ | H01M 2/1077 |
| | | | | 429/153 |
| 2015/0372268 A1* | 12/2015 | Ichikawa | ......... | H01M 2/1061 |
| | | | | 429/87 |
| 2016/0218337 A1* | 7/2016 | Morisaku | ......... | H01M 2/1077 |

FOREIGN PATENT DOCUMENTS

| | | | |
|---|---|---|---|
| CN | 103733382 A | 4/2014 | |
| JP | 2011-222419 A | 11/2011 | |
| JP | 2013-152917 A | 8/2013 | |
| JP | 2014-082080 A | 5/2014 | |
| WO | WO-2014103007 A1 * | 7/2014 | .......... H01M 2/1077 |
| WO | WO-2015/033795 A1 | 3/2015 | |

OTHER PUBLICATIONS

Office Action Issued in Corresponding Chinese Application No. 201680025096.4 dated Oct. 30, 2019.
Office Action received in corresponding Chinese Patent Application No. 201680025096.4 dated Mar. 2, 2020.

\* cited by examiner

CELL MODULE

TECHNICAL FIELD

The present invention relates to a battery module having a plurality of battery cells held by a cell holder.

BACKGROUND ART

PTL 1 describes a structure of a battery cell provided with a locking claw so that the locking claw locks a bus bar housing member. Then, PTL 2 describes a structure of a cell holder provided with a locking claw to lock a nozzle holder for introducing an exhaust gas from a gas exhaust valve to a gas exhaust duct.

CITATION LIST

Patent Literature

PTL 1: JP 2014-082080 A
PTL 2: JP 2011-222419 A

SUMMARY OF INVENTION

Technical Problem

For example, battery modules are assembled by mounting components, such as bus bar holders, to battery cell stacks having a stack of a plurality of battery cells, but the plurality of battery cells and the components have a dimensional error, and assembly thereof may cause an increase in dimensional error as a whole.

In any of the structures described in the above PTLs 1 and 2, since the locking claw provided at one member is structured to be caught by a fixed catch provided at the other member, when such a structure is applied to an assembly structure of a battery module, the locking claw cannot be appropriately caught by the catch due to the dimensional error, and components may not be locked to a battery cell stack.

The present invention has been made in view of the above description, and it is an object of the present invention to provide a battery module having a structure with which dimensional errors of assembly components can be absorbed for reliable locking and assembling.

Solution to Problem

In order to solve the problem, a battery module according to the present invention is a battery module including a plurality of battery cells arranged, the battery cells each having a square battery container and external terminals provided on one surface of the battery container, and a bus bar for conductively connecting adjacent external terminals, the battery module includes a cell holder interposed between the battery cells to hold the plurality of battery cells, and a bus bar holder mounted to the cell holder to hold the bus bar, in which the cell holder is provided with a first claw-shaped locking portion, the bus bar holder is provided with a second claw-shaped locking portion, and the first and second claw-shaped locking portions are locked to each other.

Advantageous Effects of Invention

According to the present invention, the first claw-shaped locking portions provided at the cell holder, and the second claw-shaped locking portions provided at the bus bar holder are engaged to each other to mount the bus bar holder to the cell holders, and dimensional errors of each component, such as the battery cell or the cell holder, constituting the battery module can be absorbed. Note that problems, configurations, and effects other than the above description will be made clear by the following description of the embodiments.

DESCRIPTION OF EMBODIMENTS

Figure 1:
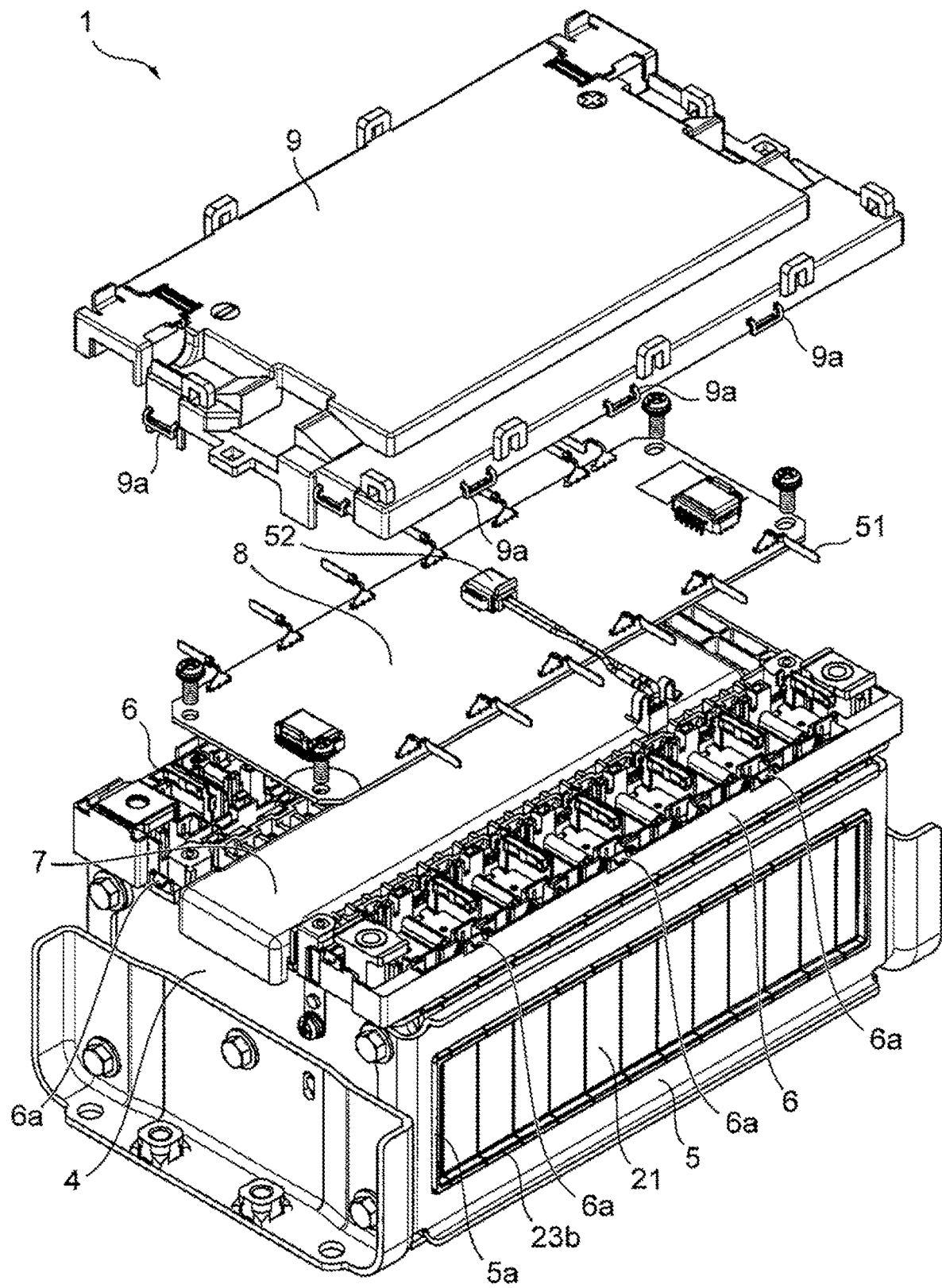
FIG. 1 is an exploded perspective view illustrating an example of a battery module.

Hereinafter, an embodiment of the present invention will be described with reference to the drawings.

Note that, in the drawings, the same names and reference signs represent the same or equivalent materials, and repeated description will be omitted. Furthermore, the sizes and shapes of members in the drawings are illustrated as examples, and modes of members or the like as set forth in claims are not limited thereto. In the following examples, a battery module used for a vehicle, such as an HEV or an EV, is exemplified, but the battery module can be employed for consumer use or industrial use, and, for example, can be also used as a fixedly disposed electrical storage device.

Figure 2:
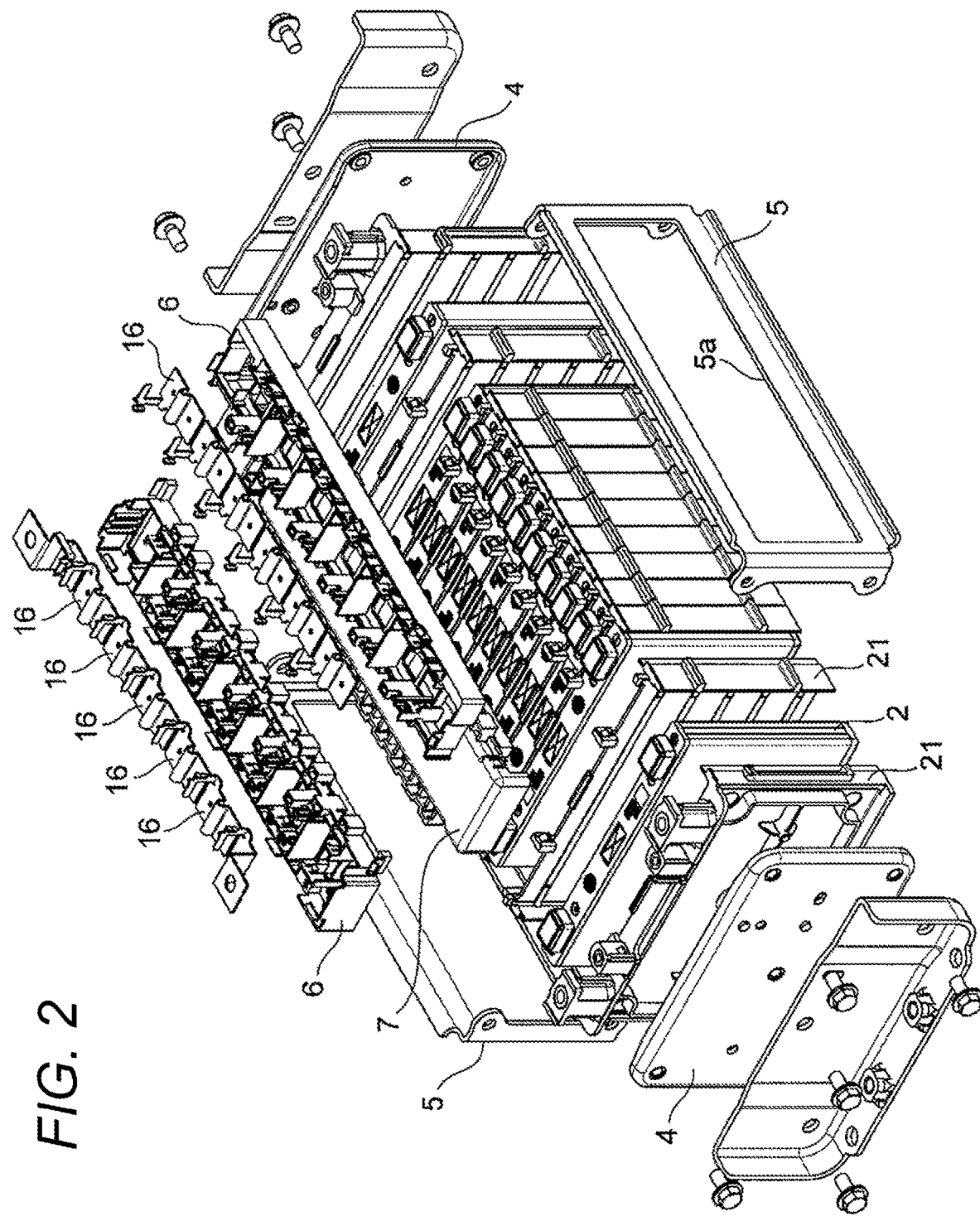
FIG. 2 is an exploded perspective view illustrating a configuration of a battery module.
Figure 3:
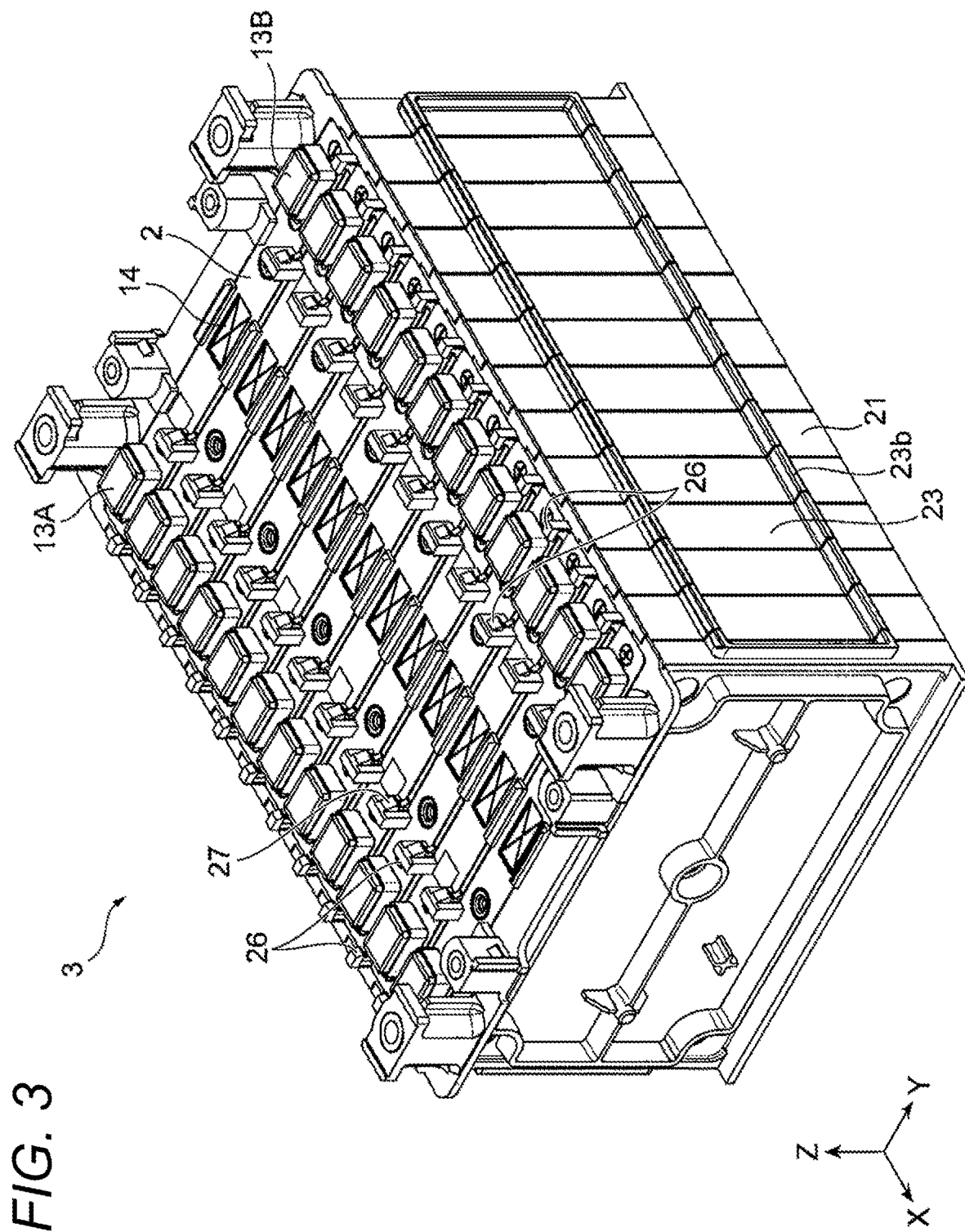
FIG. 3 is a perspective view of a battery cell stack.
Figure 4:
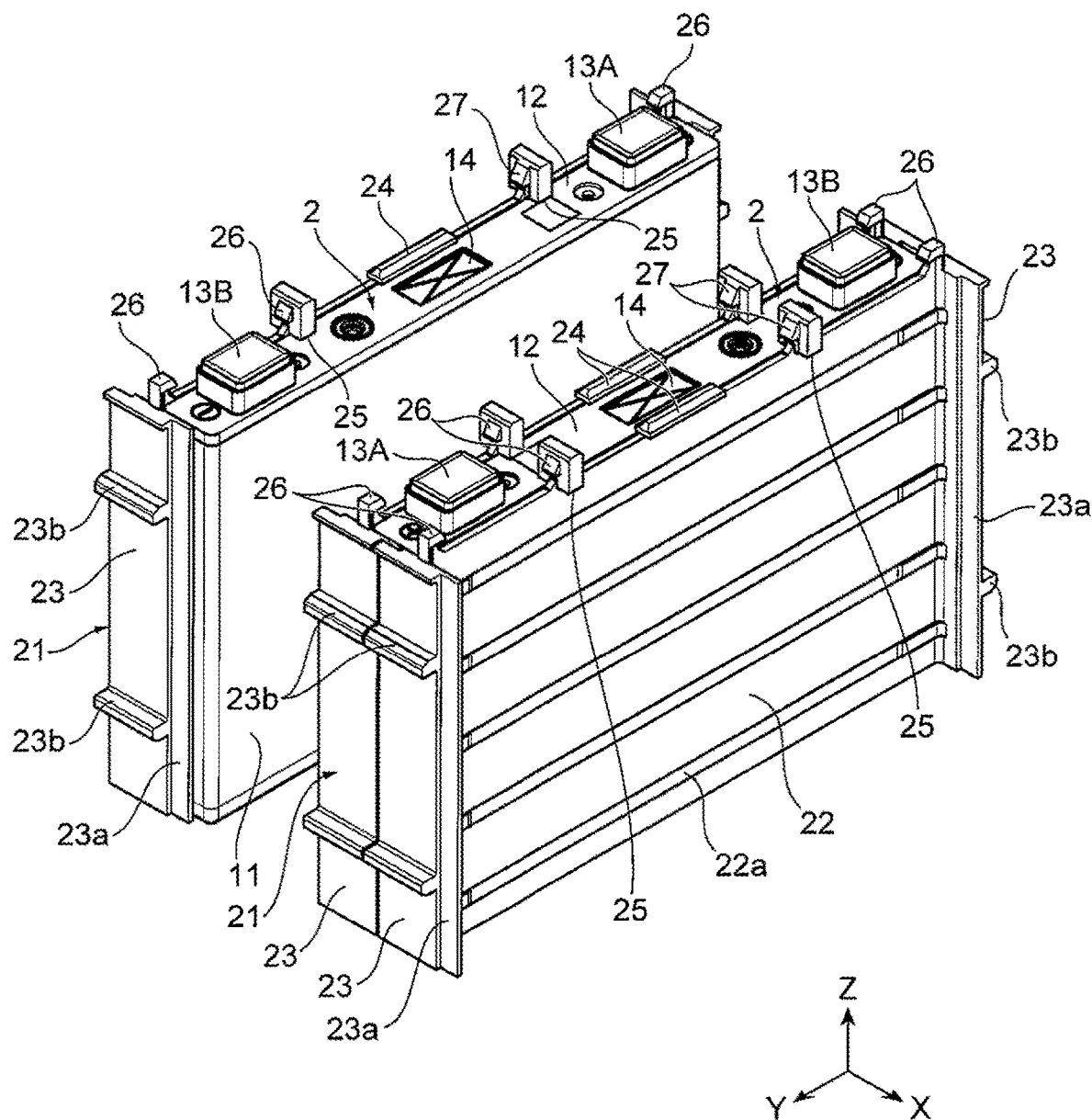
FIG. 4 is an exploded perspective view of battery cells and cell holders.
Figure 5:
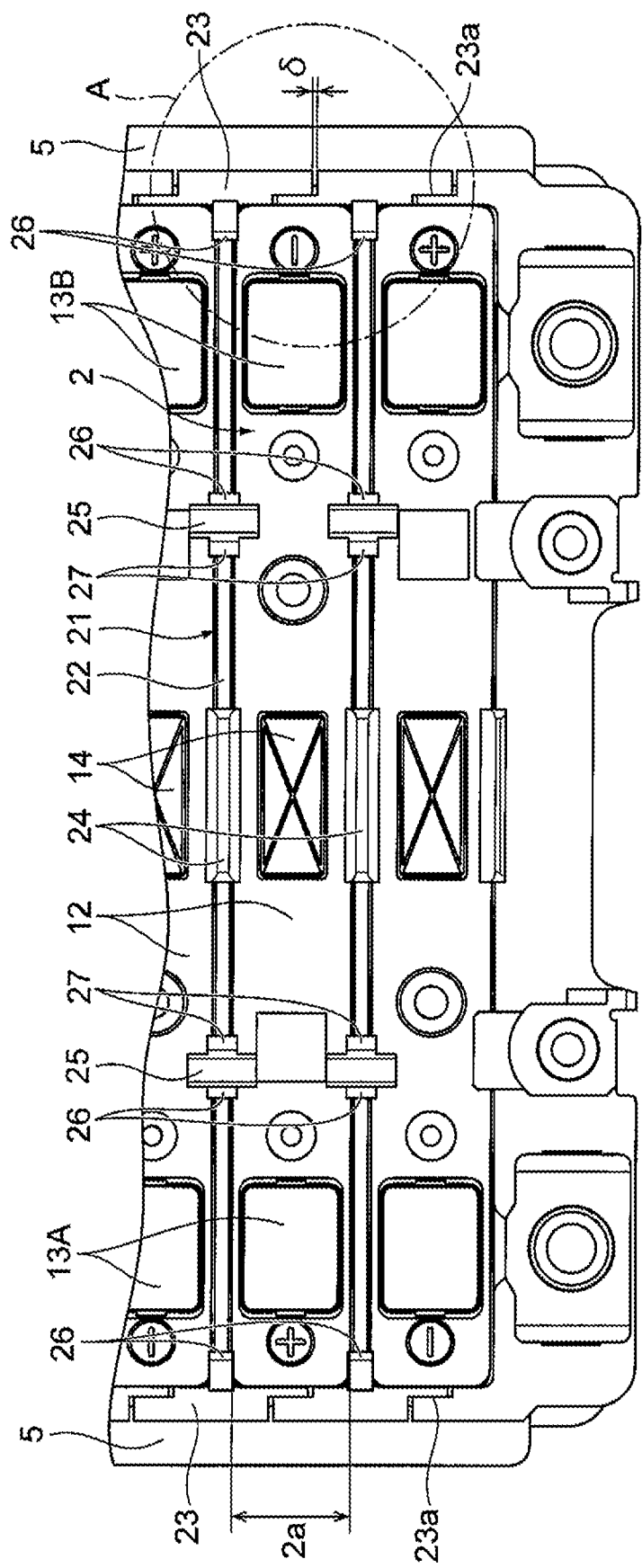
FIG. 5 is an enlarged plan view illustrating a main portion of a battery cell stack.
Figure 6:
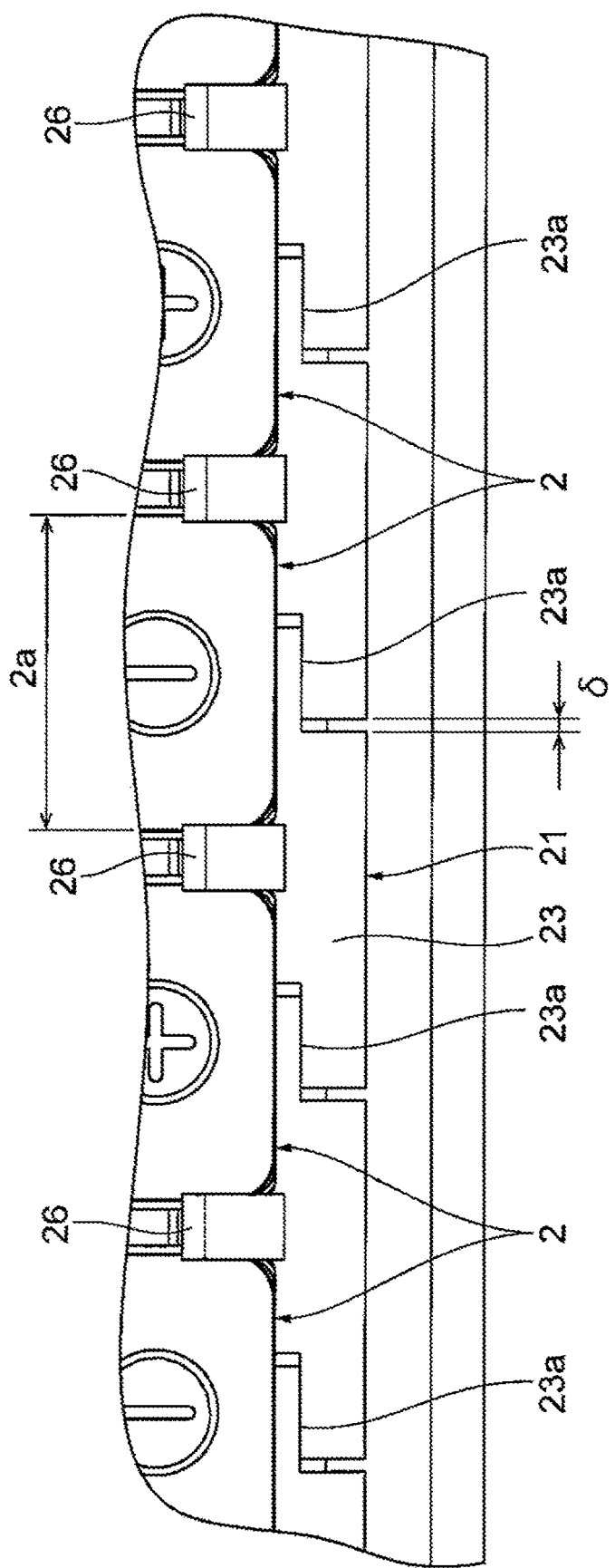
FIG. 6 is an enlarged view of an A portion of FIG. 5.

FIG. 1 is an exploded perspective view illustrating an example of a battery module, FIG. 2 is an exploded perspective view illustrating a configuration of the battery module, FIG. 3 is a perspective view of a battery cell stack, FIG. 4 is an exploded perspective view of battery cells and cell holders, FIG. 5 is an enlarged plan view illustrating a main portion of the battery cell stack, and FIG. 6 is an enlarged view of an A portion of FIG. 5.

As illustrated in FIG. 3, a battery module 1 includes a battery cell stack 3 having a plurality of square battery cells 2 stackingly arranged. The battery cell stack 3 holds each of the battery cells 2 from outside in a stacking direction, between cell holders 21. The cell holders 21 are interposed between the plurality of battery cells 2 to hold these battery cells 2. As illustrated in FIG. 2, the battery cell stack 3 is securely bound by a pair of end plates 4 arranged at both ends in the stacking direction of the battery cells 2 (X direction in FIG. 3), and a pair of side surface holding plates 5 arranged on both sides in a cell width direction (Y direction in FIG. 3), orthogonal to the stacking direction of the battery cells 2.

Then, bus bar holders 6 and a gas exhaust duct 7 are mounted on the upper side in a cell height direction of the battery cell stack 3 (Z direction in FIG. 3), and a module cover 9 is further mounted to cover the bus bar holders 6 and the gas exhaust duct 7. A circuit board 8 having a voltage detection circuit and a temperature measurement circuit is disposed between the gas exhaust duct 7 and the module cover 9.

Each bus bar holder 6 and the gas exhaust duct 7 are arranged to extend along the stacking direction of the battery cells 2. The bus bar holder 6 and the gas exhaust duct 7 include an insulating synthetic resin material, and the bus bar holder 6 is formed of a material larger in elastic modulus than that of the gas exhaust duct 7. For example, in the present embodiment, the bus bar holder 6 is made of PP, and the gas exhaust duct 7 is made of PBT.

The bus bar holders 6 are separately provided in pair on both sides in the cell width direction of the battery cell stack 3, and houses bus bars 16 for conductively connecting adjacent positive electrode external terminals 13A and negative electrode external terminals 13B of the battery cells 2. The bus bar holders 6 functions as an insulating cover for the positive electrode external terminals 13A and the negative electrode external terminals 13B of the battery cells 2 and the bus bars 16.

The gas exhaust duct 7 is arranged at a center position in the cell width direction of the battery cell stack 3 to communicate with a gas exhaust valve 14 of a battery cell 2, and conducts and exhausts an exhaust gas from the gas exhaust valve 14 to outside the battery module 1. The module cover 9 is provided with a plurality of catches 9a, each of the catches 9a catches a corresponding locking claw 6a provided at a bus bar holder 6, and the module cover 9 is locked to the bus bar holders 6.

A side surface holding plate 5 has a frame shape in which a rectangular opening portion 5a is formed at the center of a flat plate portion extending along a side surface of the battery cell stack 3, and the side surface holding plate 5 has flange pieces at both ends to be fastened to the end plates 4 with screws. A fixed bracket is mounted to an end plate 4.

For example, as illustrated in FIG. 4, each of the battery cells 2 includes a battery container 11 having a flat square shape to hermetically house an electrode group and an electrolytic solution therein. The battery container 11 includes a bottom surface having a rectangular shape, a pair of wide main surfaces bent upright from a pair of long side portions of the bottom surface, and a pair of narrow side surfaces bent upright from a pair of short side portions of the bottom surface, and an upper portion opposite to the bottom surface is sealed by a battery lid 12. The battery lid 12 forms one surface of the battery container 11, and is provided with a positive electrode external terminal 13A and a negative electrode external terminal 13B, on both sides in the cell width direction, and the gas exhaust valve 14 at the center in the cell width direction, as illustrated in FIG. 4. The gas exhaust valve 14 has a structure opened by an inner pressure of the battery container rising to or above a predetermined value to discharge a gas in the battery container.

Each of the cell holders 21 includes a main surface facing wall portion 22 extending flat to face a main surface of the battery cell 2, and side surface facing wall portions 23 projecting from both side ends of the main surface facing wall portion 22 to face side surfaces of the battery cell 2 on both sides in the cell width direction. The main surface facing wall portion 22 is provided with a cell holding ridge portion 22a. The cell holding ridge portion 22a extends with a constant width from an end of one side surface facing wall portion 23 to an end of the other side surface facing wall portion 23, and a plurality of the cell holding ridge portions 22a (five ridges in the present embodiment) is provided at predetermined intervals in a height direction of the cell holder 21.

The side surface facing wall portions 23 project in separating directions along a direction orthogonal to the main surface facing wall portion 22, and each have an end portion provided with a connection joint portion 23a for connecting and joining a side surface facing wall portion 23 of an adjacent cell holder 21. The connection joint portion 23a has a stepped shape to overlap a connection joint portion 23a of a side surface facing wall portion 23 of an adjacent cell holder 21 for connection, and to extend in the stacking direction of the battery cell stack. The side surface facing wall portion 23 is formed so that a pitch between connected cell holders 21 is smaller than a thickness 2a of a battery cell 2, and for example, as illustrated in FIG. 6, the side surface facing wall portions 23 are configured to face each other with a gap 5 therebetween. Accordingly, even when the thicknesses of battery cells 2 vary due to an error, the battery cells 2 can be reliably held by the cell holders 21.

The side surface facing wall portion 23 has an outside surface provided with plate engagement portions 23b. As illustrated in FIG. 3, the plate engagement portions 23b form a continuous projection portion in a rectangular frame shape, upon forming the battery cell stack 3. Then, when a side surface holding plate 5 is mounted to a side surface of the battery cell stack 3, the plate engagement portions 23b are inserted into the opening portion 5a of the side surface holding plate 5 to be arranged along an end edge of the opening portion 5a, engaged with the opening portion 5a, and the cell holders 21 are positioned relative to the side surface holding plate 5.

Each cell holder 21 includes a first abutment piece 24 and a second abutment piece 25 which face a battery lid 12 of a battery cell 2 for abutment. The first abutment piece 24 is provided at an upper end of the main surface facing wall portion 22 in a cell height direction, and at the center in the cell width direction. The second abutment piece 25 is provided at an upper end of the main surface facing wall portion 22 in the cell height direction, and between the first abutment piece 24 and both ends of the cell holder 21 in a cell width direction, and when the battery cell 2 is held by the cell holder 21, the second abutment pieces 25 are arranged at intermediate positions between the positive electrode external terminal 13A and the gas exhaust valve 14, and the negative electrode external terminal 13B and the gas exhaust valve 14, in the cell width direction. The first abutment piece 24 and the second abutment pieces 25 project in a direction orthogonal to the main surface facing wall portion 22, and oppositely abut on the battery lid 12 of the battery cell 2 to restrict upward movement of the battery cell 2 in the cell height direction. Note that the second abutment pieces 25 are not limited to the above configuration, and for example, the second abutment pieces 25 may be configured to extend from the intermediate positions between the positive electrode external terminal 13A and the gas exhaust valve 14, and the negative electrode external terminal 13B and the gas exhaust valve 14 in the cell width direction, to near bus bar holder locking portions 26 provided at both ends of the cell holder 21 in the cell width direction, when a battery cell 2 is held by the cell holder 21, and such a configuration can secure a long creepage distance for abutment on the battery lid 12 of the battery cell 2 to reliably restrict the upward movement of the battery cell 2 in the cell height direction.

Each cell holder 21 has a lower end in the cell height direction, opened to expose a bottom surface of a battery cell 2. For example, for temperature control of a battery cell 2, although not illustrated, a heat transfer sheet, heat transfer grease, or the like is arranged to be in contact with a bottom surface of each battery cell 2, and thermal conduction efficiency can be increased. In temperature control, since bubbles entering a heat transfer surface causes increase in thermal resistance, a heat-transfer medium in contact with a battery cell 2 needs to have higher adhesiveness to the battery cell 2, and the heat-transfer medium in close contact or being compressed is used. When the heat-transfer medium is brought into close contact with or compressed to the bottom surface of a battery cell 2, a stress is generated in the battery cell 2, from the lower side to the upper side in the cell height direction, but the first abutment piece 24 and the second abutment piece 25 of the cell holder 21 abutting on the battery lid 12 of the battery cell 2 can receive such a stress, and the heat-transfer medium and the battery cell 2 can be brought into closer contact to reduce the thermal resistance.

Each cell holder 21 is provided with a bus bar holder locking portion 26 (first claw-shaped locking portion) for locking the bus bar holders 6, and a duct locking portion 27 (third claw-shaped locking portion) for locking the gas exhaust duct 7. The bus bar holder locking portion 26 and the duct locking portion 27 are provided to project upward from an upper end of the main surface facing wall portion 22 in the cell height direction.

For example, as illustrated in FIG. 4, pairs of the bus bar holder locking portions 26 are provided at separate positions on both sides of the cell holder 21 in the cell width direction, and the bus bar holder locking portions 26 are separately arranged at inside and outside opposing positions in the cell width direction, through a positive electrode external terminal 13A and a negative electrode external terminal 13B of a battery cell 2. Then, the bus bar holder locking portions 26 on the outside in the cell width direction have a hook shape projecting toward the inside in the cell width direction, and the bus bar holder locking portions 26 on the inside in the cell width direction have a hook shape projecting outward in the cell width direction. That is, each of the bus bar holder locking portions 26 on the outside in the cell width direction, and each of the bus bar holder locking portions 26 on the inside in the cell width direction have hook shapes projecting in approaching directions.

The duct locking portion 27 is arranged at separate opposing positions on both sides in the cell width direction, through the gas exhaust valve 14 of the battery cell 2. The duct locking portions 27 have hook shapes projecting in approaching directions, toward the inside in the cell width direction.

Figure 7:
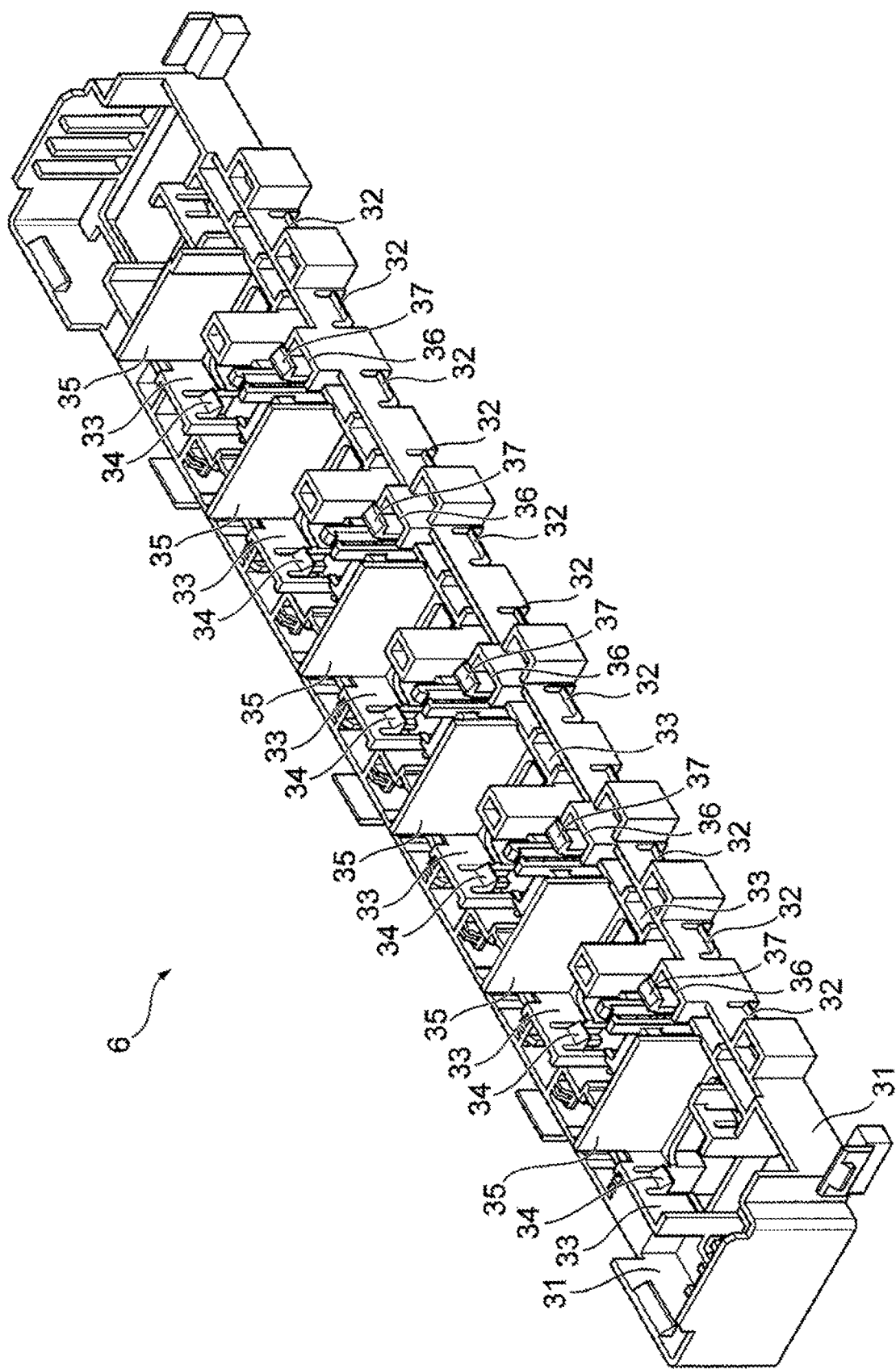
FIG. 7 is a perspective view of a bus bar holder.
Figure 8:
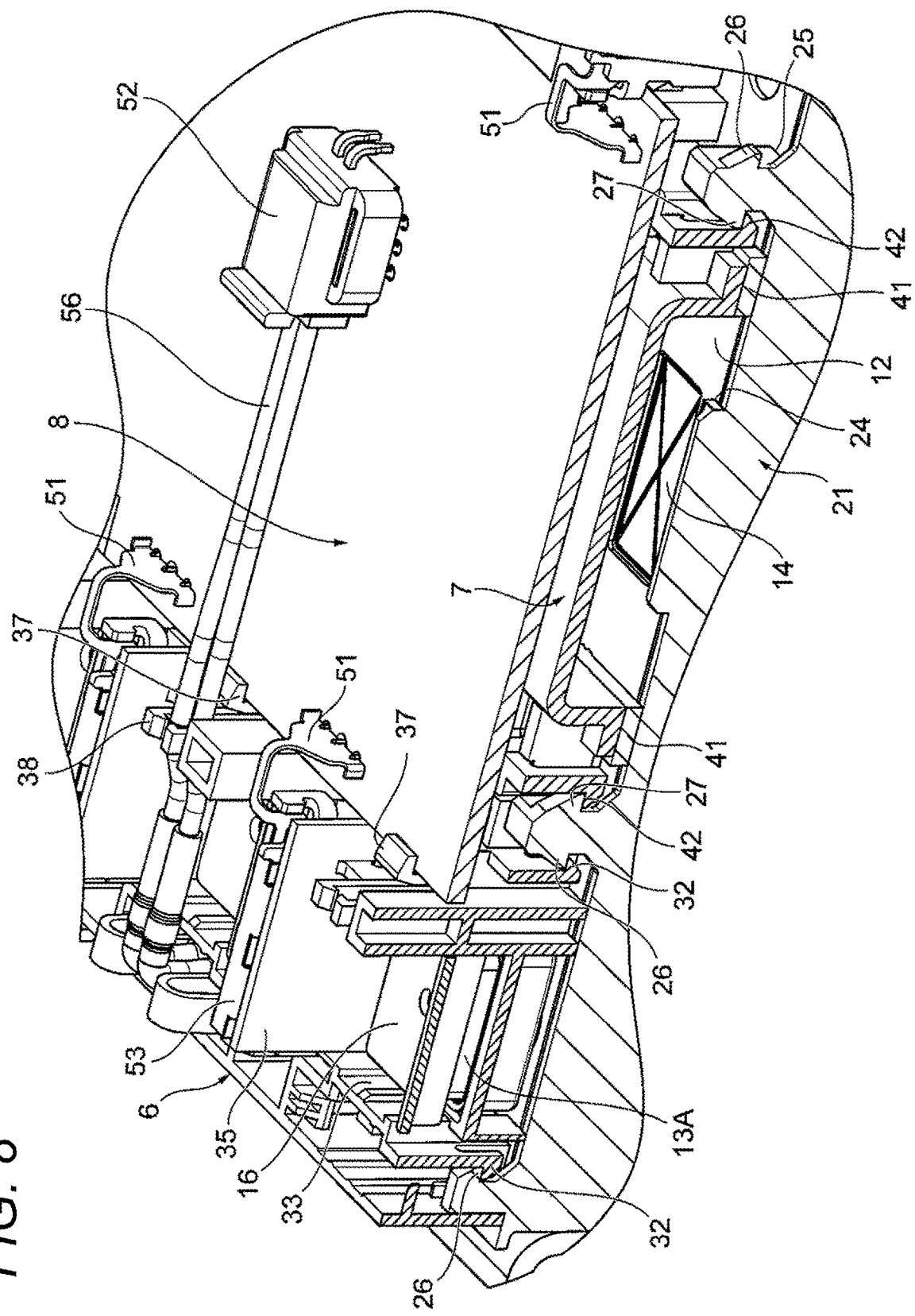
FIG. 8 is an enlarged perspective cross-sectional view illustrating a main portion of a battery module.
Figure 9:
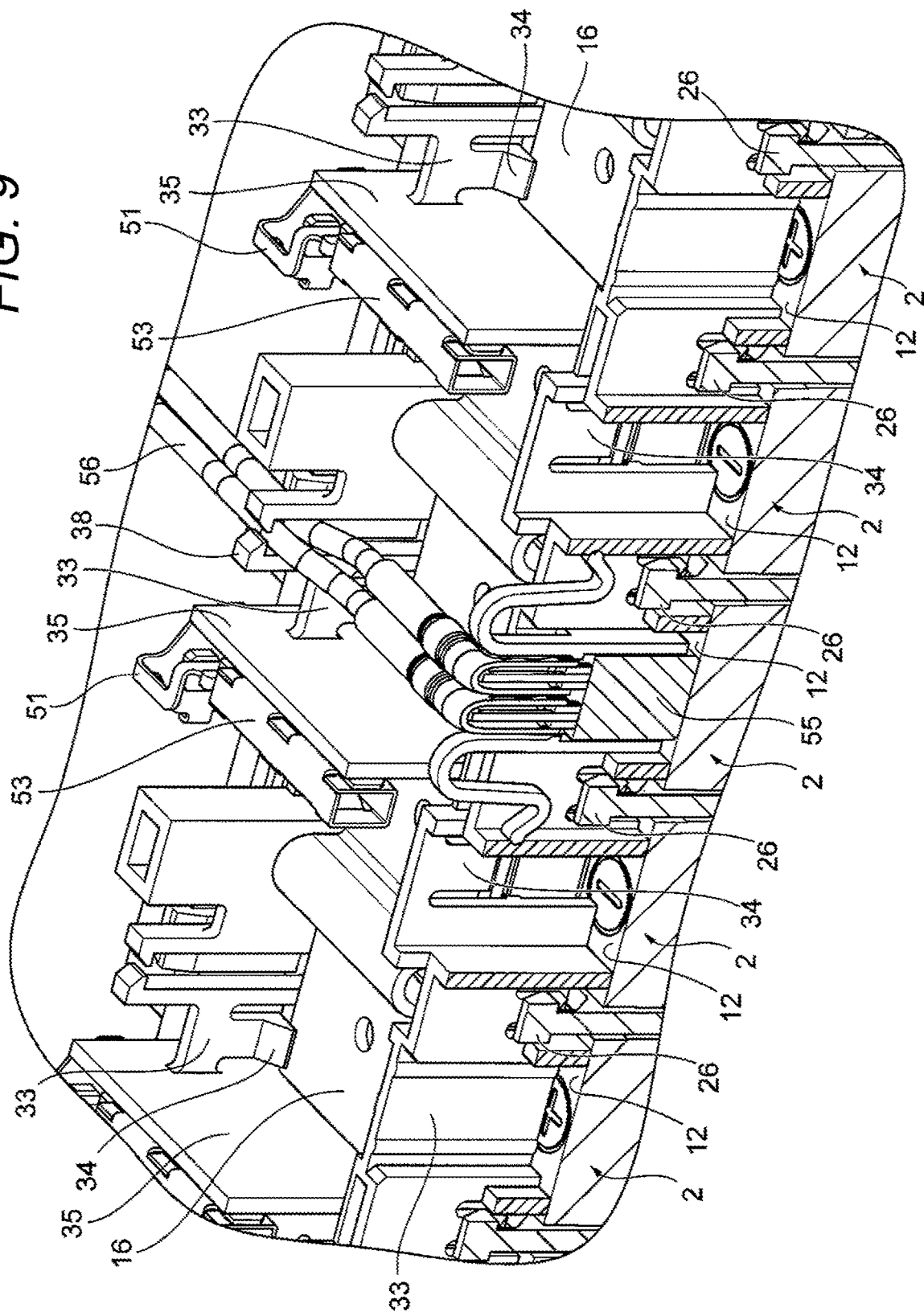
FIG. 9 is an enlarged perspective cross-sectional view illustrating a main portion of a battery module.
Figure 10:
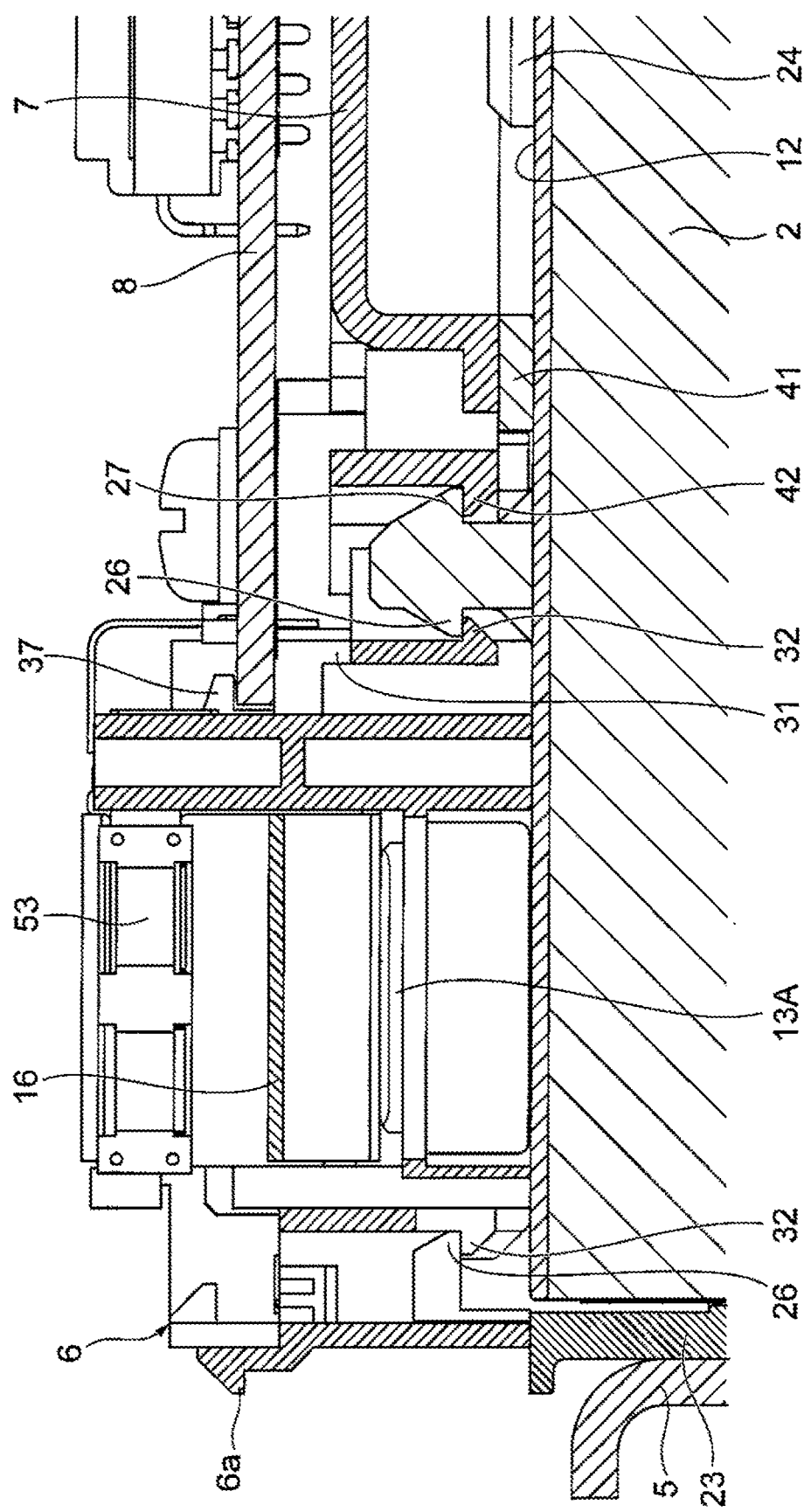
FIG. 10 is an enlarged cross-sectional view illustrating a main portion of a battery module.
Figure 11:
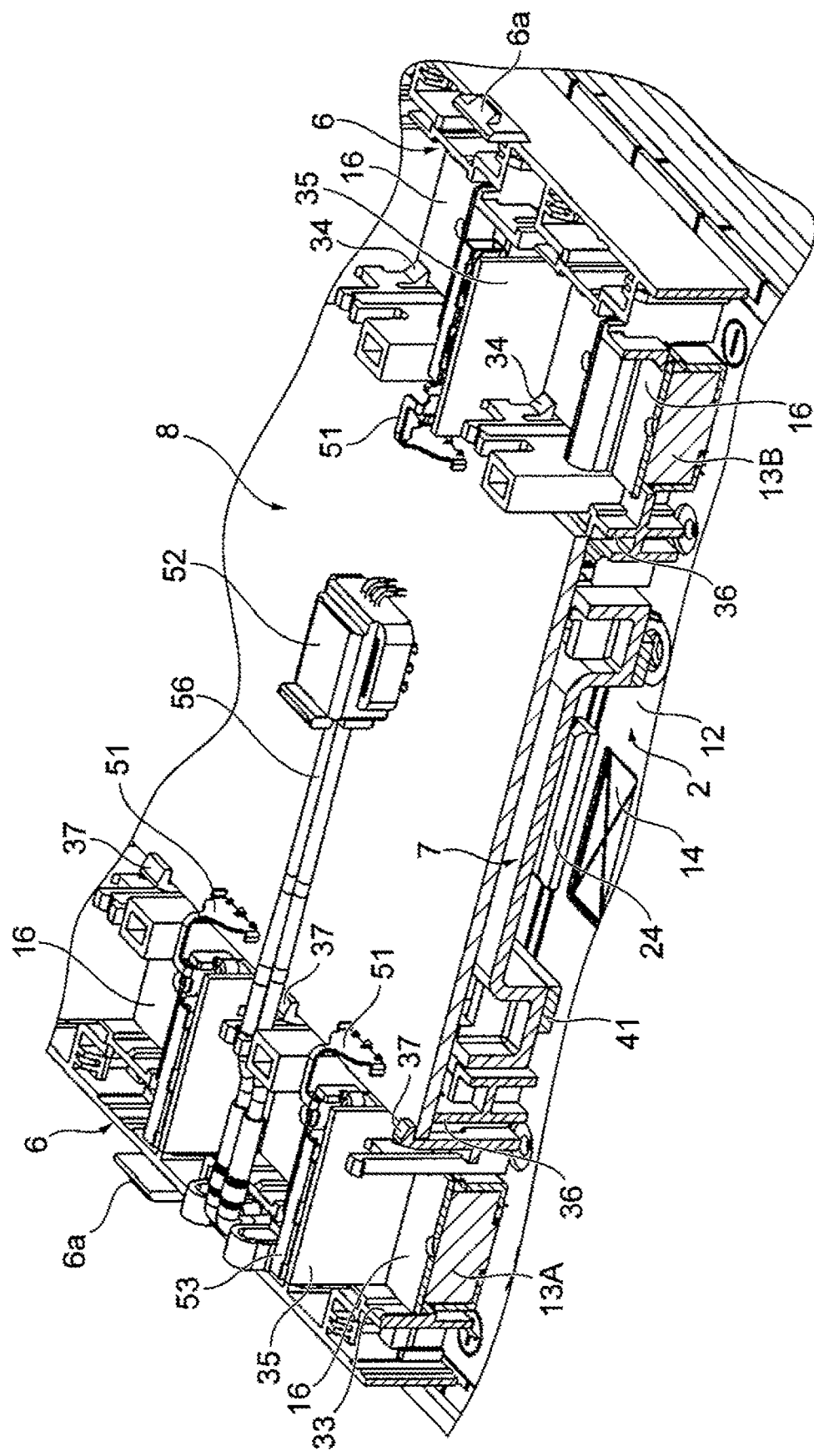
FIG. 11 is an enlarged perspective cross-sectional view illustrating a main portion of a battery module.
Figure 12:
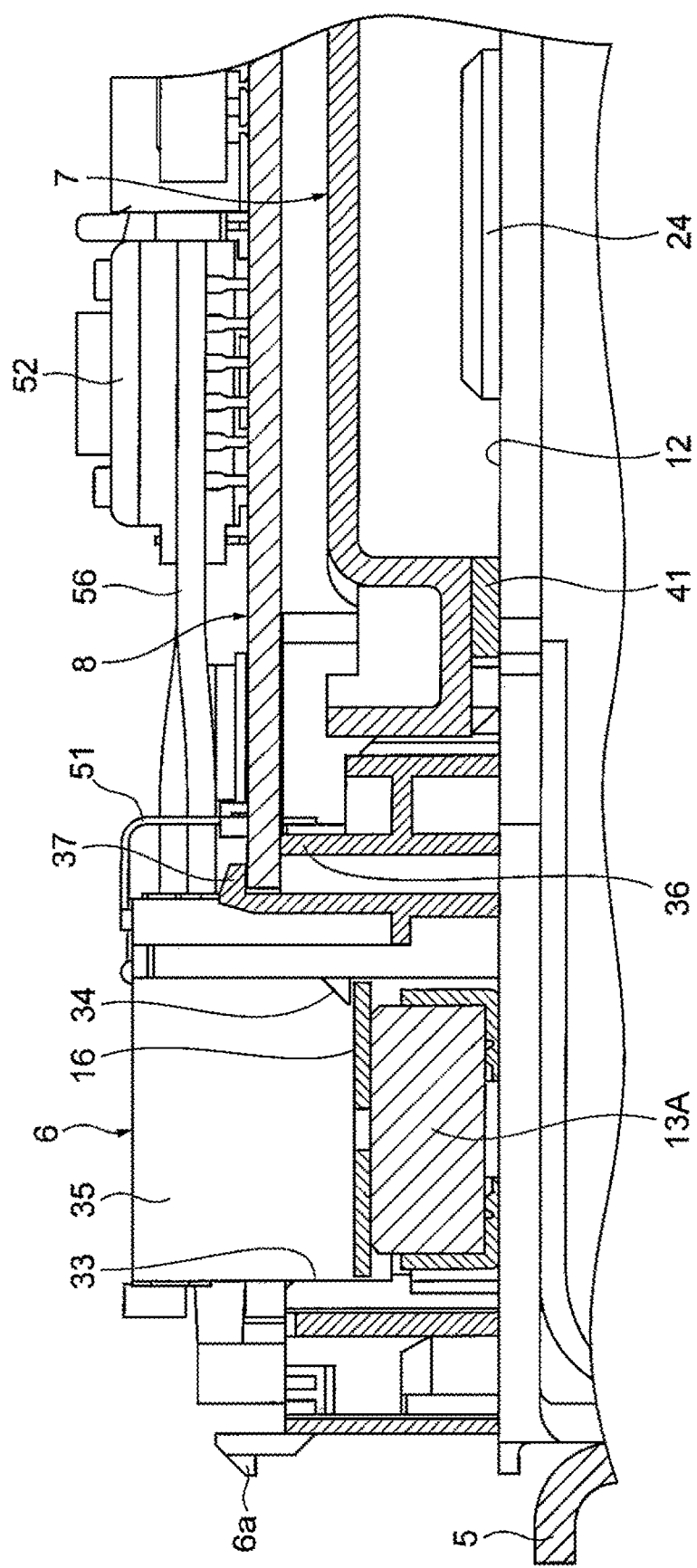
FIG. 12 is an enlarged cross-sectional view illustrating a main portion of a battery module.

FIG. 7 is a perspective view of a bus bar holder, FIGS. 8, 9, and 11 are enlarged perspective cross-sectional views illustrating main portions of the battery module, and FIGS. 10 and 12 are enlarged cross-sectional views illustrating main portions of the battery module.

Each bus bar holder 6 houses a plurality of bus bars 16 separately insulated. The bus bar holder 6 includes a pair of side wall portions 33 separately opposing in a cell width direction, through a positive electrode external terminal 13A or a negative electrode external terminal 13B, and a plurality of diaphragm portions 35 arranged at predetermined intervals in the stacking direction, a bus bar 16 is housed in a holding portion surrounded by the pair of side wall portions 33 and the diaphragm portions 35 opposing each other. The bus bar holder 6 has a bottom surface provided with an opening portion, and when the bus bar holder 6 is mounted to a cell holder 21, the positive electrode external terminal 13A or the negative electrode external terminal 13B inserted in the opening can be exposed in the bus bar holder 6.

The bus bar 16 is held with a clearance to be slid in the cell height direction, in the holding portion surrounded by the side wall portions 33 and the diaphragm portions 35 of the bus bar holder 6. The pair of side wall portions 33 is provided with a claw portion 34 opposing an upper surface of the bus bar 16. The claw portion 34 prevents the bus bar 16 in the bus bar holder 6 from moving upward in the cell height direction and being removed from the bus bar holder 6.

The bus bar holder 6 is provided with cell holder locking portions 32 (second claw-shaped locking portion) locking to the cell holder 21. The cell holder locking portions 32 are separately provided on one side and the other side of the bus bar holder 6 in the cell width direction to be separately arranged at opposing positions on both sides in the cell width direction, through the positive electrode external terminal 13A and the negative electrode external terminal 13B of a battery cell 2. As illustrated in FIGS. 8 and 10, a cell holder locking portion 32 on the outside in the cell width direction has a hook shape projecting outward in the cell width direction, and is locked to a bus bar holder locking portion 26 provided on the outside of a cell holder 21 in the cell width direction. Then, a cell holder locking portion 32 on the inside in the cell width direction has a hook shape projecting toward the inside in the cell width direction, and is locked to a bus bar holder locking portion 26 provided on the inside of the cell holder 21 in the cell width direction. That is, the cell holder locking portion 32 on the outside in the cell width direction, and the cell holder locking portion 32 on the inside in the cell width direction each have hook shapes projecting in separating directions.

The bus bar holder 6 is pressed against the cell holder 21 from above the cell holder 21 in the cell height direction, and the cell holder locking portions 32 of the bus bar holder 6 can be locked to the bus bar holder locking portions 26 of the cell holder 21. Accordingly, the bus bar holder 6 can be mounted to the cell holder 21 in a single operation, and assembly work can be simplified. Furthermore, a simple structure and simple appearance can be provided, in comparison with a fastening structure using a screw. Thus, for example, in comparison with a fastening structure for fastening a nut, insert-molded in a cell holder, and a bolt to secure a bus bar holder, insert molding is omitted from cell holder molding, and screw fastening is omitted from assembly work, the number of components can be reduced, and manufacturing and assembling cost can be reduced to provide an inexpensive product. Furthermore, use of a metal component, such as a screw, can be reduced as much as possible to reduce a risk of electrical shock or the like.

The gas exhaust duct 7 is arranged opposite to the gas exhaust valves 14 of the battery lids 12. The gas exhaust duct 7 has a C-shaped cross-section, and cooperates with the battery lids 12 of the battery cells 2 to form a closed cross-section extending in the stacking direction. The gas exhaust duct 7 is provided with sealing members 41 at the flange pieces opposing the battery lids 12, and seals the battery lids 12 to prevent the gas from leaking.

The gas exhaust duct 7 is provided with cell holder locking portions 42 (fourth claw-shaped locking portion) locking to the cell holder 21. The cell holder locking portions 42 are separately provided on one side and the other side of the gas exhaust duct 7 in the cell width direction, to be arranged at positions opposing duct locking portions 27 of a cell holder 21, corresponding to the respective cell holders 21. The cell holder locking portions 42 each have a hook shape projecting toward the inside in the cell width direction, and are locked to the duct locking portions 27 of each cell holder 21.

The gas exhaust duct 7 is pressed against the cell holder 21 from above the cell holder 21 in the cell height direction, and the cell holder locking portions 42 of the gas exhaust duct 7 can be locked to the duct locking portions 27 of the cell holder 21. Accordingly, the gas exhaust duct 7 can be mounted to the cell holder 21 in a single operation, and assembly work can be simplified. Furthermore, as in the bus bar holder 6, a simple structure and simple appearance can be provided, in comparison with a fastening structure using a screw. Thus, for example, in comparison with a structure having a nut insert-molded in a cell holder, insert molding is omitted, and screw fastening is omitted from assembly work, the number of components can be reduced, and manufacturing and assembling cost can be reduced to provide an inexpensive product. Furthermore, use of a metal component, such as a screw, can be reduced as much as possible to reduce a risk of electrical shock or the like.

The circuit board 8 is locked to a pair of the bus bar holders 6 arranged on both sides of the circuit board 8 in the cell width direction. Each of the bus bar holder 6 includes substrate seat portions 36 on which the circuit board 8 is mounted, and circuit board locking portions 37 (fifth claw-shaped locking portion). As illustrated in FIGS. 11 and 12, each of the circuit board locking portions 37 is provided at an inner end of the bus bar holder 6 in the cell width direction and has a hook shape projecting toward the inside of the battery cell stack 3 in the cell width direction. The circuit board 8 is pressed toward the gas exhaust duct 7 from above in the cell height direction to elastically deform each circuit board locking portion 37 so that the circuit board locking portion 37 passes through an end of the circuit board 8, and the end of the circuit board 8 is held between the circuit board locking portion 37, and the substrate seat portion 36 of the bus bar holder 6.

In the present embodiment, the circuit board 8 has four corners fastened with screws to cell holders 21 positioned at both ends in the stacking direction. Accordingly, for example, even when the gas blows out from a gas exhaust valve 14 of a battery cell 2, the gas exhaust duct 7 is urged upward in the cell height direction, and thereby a locked claw is removed from a cell holder 21, the gas exhaust duct 7 abuts on the circuit board 8, and thus further movement thereof can be prevented.

The circuit board 8 is provided with voltage detection terminals 51 each detecting a voltage of a battery cell 2, and a wiring connector 52 for a temperature measurement sensor. Each of the voltage detection terminals 51 projects outward in the cell width direction, and conductively connected to a bus bar 16 through a relay terminal 53. The voltage detection circuit of the circuit board 8 detects a voltage of a battery cell 2 from a bus bar 16 through a voltage detection terminal 51.

A temperature measurement sensor 55 is removably mounted to a bus bar holder 6. The temperature measurement sensor 55 is supported by the bus bar holder 6 through an elastic support member, and abuts on a battery cell 2 with a predetermined pressing force. The temperature measurement sensor 55 has wires 56 supported by a cable support portion 38 provided at the bus bar holder 6, and each having a socket at an end to be connected to the wiring connector 52. The temperature measurement circuit of the circuit board 8 measures the temperature of the battery cell 2, on the basis of a signal from the temperature measurement sensor 55.

A method of assembling the battery module 1 having the above configuration will be described.

Firstly, as illustrated in FIG. 4, the plurality of battery cells 2 is held and stacked between the cell holders 21, and the battery cell stack 3 illustrated in FIG. 3 is assembled. Then, the end plates 4 are compressively arranged on the outsides of the battery cell stack 3 in the stacking direction, and the side surface holding plates 5 are mounted on both sides of the battery cell stack 3 in the cell width direction. In that condition, the plate engagement portions 23b of each the side surface facing wall portion 23 of a cell holder 21, which project from a side surface of the battery cell stack 3, are engageably inserted into an opening portion 5a of a side surface holding plate 5, and each cell holder 21 is positioned relative to the side surface holding plate 5. Then, the side surface holding plates 5 are connected to the end plates 4 with bolts. According to the assembly work as described above, the battery cell stack 3 can be securely bound.

Next, installation of the bus bar holders 6 and the gas exhaust duct 7 is performed. Each of the bus bar holders 6 is mounted with the bus bars 16 in advance. The bus bar holders 6 are set on the battery cell stack 3 from above the battery cell stack 3 in the cell height direction to insert the positive electrode external terminals 13A and the negative electrode external terminals 13B of the battery cells 2 into the bus bar holders 6. Then, each of the bus bar holders 6 is pressed against the battery cell stack 3 with a predetermined pressing force to lock the cell holder locking portions 32 of the bus bar holder 6 to the bus bar holder locking portions 26 of the cell holders 21.

The cell holder locking portions 32 and the bus bar holder locking portions 26 each have a hook shape, and are readily locked to each other. Furthermore, at least one of the cell holder locking portion 32 and the bus bar holder locking portion 26 is elastically deformed, and dimensional errors are absorbed to provide reliable locking.

Owing to such locking, the bus bar holder 6 is integrally fixed to the cell holders 21 of the battery cell stack 3. After a pair of the bus bar holders 6 is attached to the battery cell stack 3, the bus bars 16 are welded and joined to the positive electrode external terminals 13A and the negative electrode external terminals 13B of the battery cells 2.

Each of the bus bar holders 6 includes a plurality of the bus bars 16 and has a clearance on an upper surface or a lower surface thereof to house the bus bars 16 to be slid in a cell height direction. Accordingly, since the bus bar holders 6 are mounted to the battery cell stack 3, bus bars 16 can be readily set on adjacent positive electrode external terminals 13A and adjacent negative electrode external terminals 13B of battery cells 2, and the bus bars 16 can be readily welded and joined to the positive electrode external terminals 13A and the negative electrode external terminals 13B.

Then, the gas exhaust duct 7 is also similarly set on the battery cell stack 3, and pressed to the battery cell stack 3 with a predetermined pressing force, and cell holder locking portions 42 of the gas exhaust duct 7 are locked to duct locking portions 27 of a cell holder 21. The cell holder locking portions 42 and the duct locking portions 27 each have a hook shape, and readily locked to each other. Furthermore, at least one of the cell holder locking portion 42 and the duct locking portion 27 is elastically deformed, and dimensional errors are absorbed to provide reliable locking.

Owing to such locking, the gas exhaust duct 7 is integrally fixed to the cell holders 21 of the battery cell stack 3. The order of mounting the bus bar holder 6 and the gas exhaust duct 7 may be reversed. Furthermore, the bus bars 16 may be welded and joined to the positive electrode external terminals 13A and the negative electrode external terminals 13B of the battery cells 2, after the bus bar holders 6 and the gas exhaust duct 7 are mounted.

Next, installation of the circuit board 8 is performed. The circuit board 8 is arranged above the gas exhaust duct 7, pressed with a predetermined pressing force, and locked to the circuit board locking portions 37 of the bus bar holders 6. Then, the four corners of the circuit board 8 are fastened with screws to cell holders 21 positioned at both ends in the stacking direction. Thereafter, the relay terminals 53 are used to conductively connect the voltage detection terminals 51 to the bus bars 16. Furthermore, the temperature measurement sensor 55 is mounted to each bus bar holder 6 the wires 56 are supported by the cable support portion 38, and the sockets are connected to the wiring connector 52. Then, after connection of a cable, not illustrated, or the like, the module cover 9 is mounted.

According to the battery module 1 having the above configuration, the bus bar holder locking portion 26 and the cell holder locking portion 32 each having a hook shape are locked to each other, and dimensional errors of assembly components can be absorbed, and reliable locking and assembling can be provided, in comparison with a conventional hook and catch.

Furthermore, since a gas exhaust passage having a high pressure drop cannot be held by a support due to a large force applied to the gas exhaust duct, rigid fastening devices, such as a screw and an insert nut, have been used, and such rigid fastening devices requires a space, causing the problems of the increase in thickness of a cell holder, and the increase in outermost shape of a secondary battery module. However, in the present invention, since a cell holder 21 and the gas exhaust duct 7 are locked to each other through the locking portions, the cell holder 21 can have a reduced thickness, and a small, inexpensive, and light secondary battery module can be provided.

Furthermore, in the present invention, since a plurality of duct locking portions 27 and a plurality of cell holder locking portions 42 are provided to be locked to each other, exhaust pressure can be dispersed, pressure caused by gas diffusion can be reduced, and breakage of a supporting point can be prevented.

Thus, in the present invention, a force applied from a component member, such as the bus bar 16, the temperature measurement sensor 55, the gas exhaust duct 7, the circuit board 8, or the wire, is transmitted and dispersed from a plurality of cell holder locking portions 32 of the bus bar holder 6 to the cell holders 21, and thus, a stress applied to electrode portions of a battery can be reduced, in comparison with a conventional battery module having an electrode portion to which a bus bar, a voltage detection circuit, a wire, and the like are secured.

Furthermore, in the present invention, since a plurality of supporting portions, such as a supporting portion between a cell holder 21 and a bus bar holder 6, a supporting portion between a cell holder 21 and the gas exhaust duct 7, and the like is made of a resin material, the number of screws for fastening other members or the number of insert components can be reduced, and an inexpensive and light battery module having a reduced size can be provided.

Figure 13:
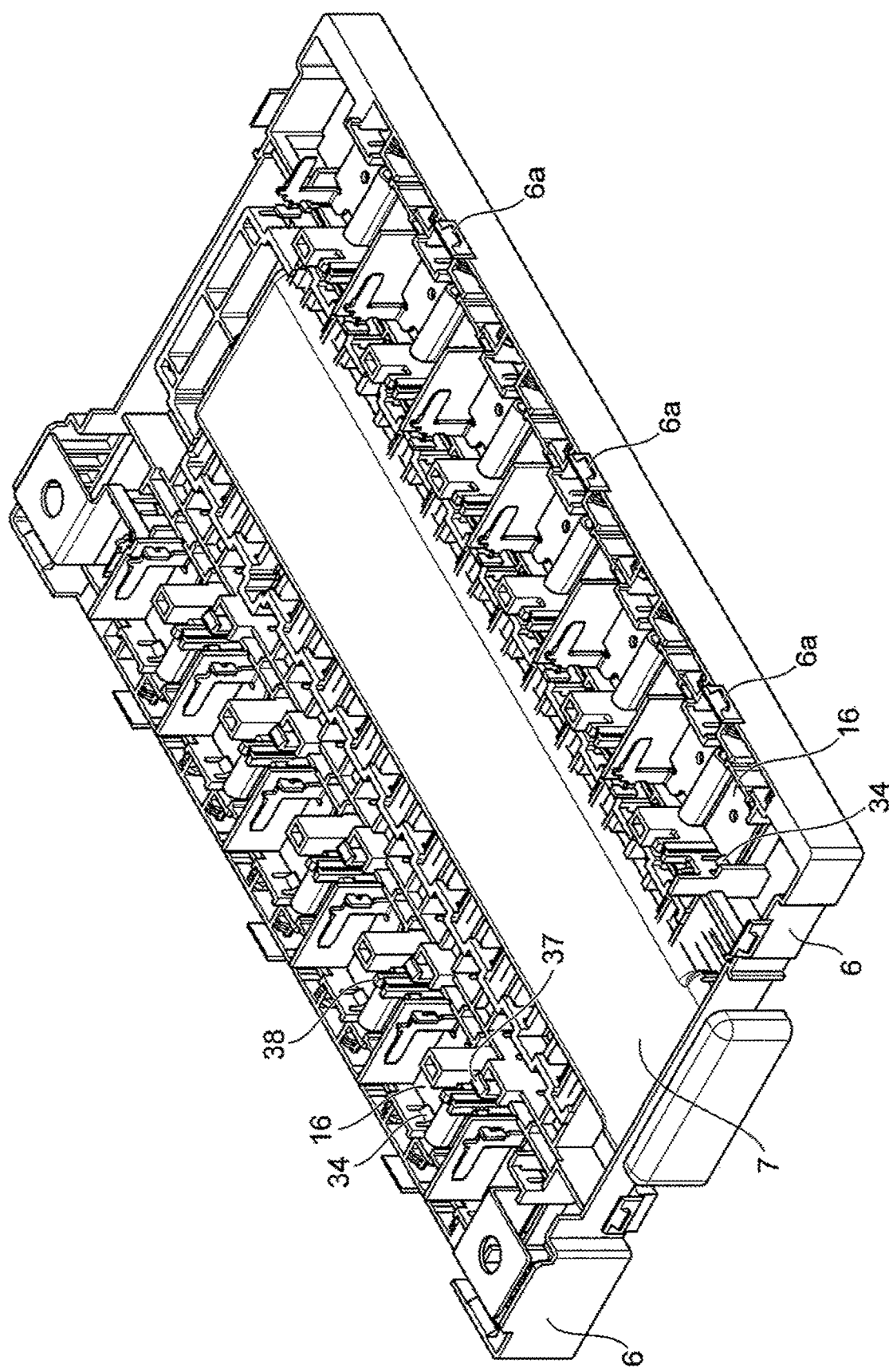
FIG. 13 is a perspective view illustrating another example of a bus bar holder.
Figure 14:
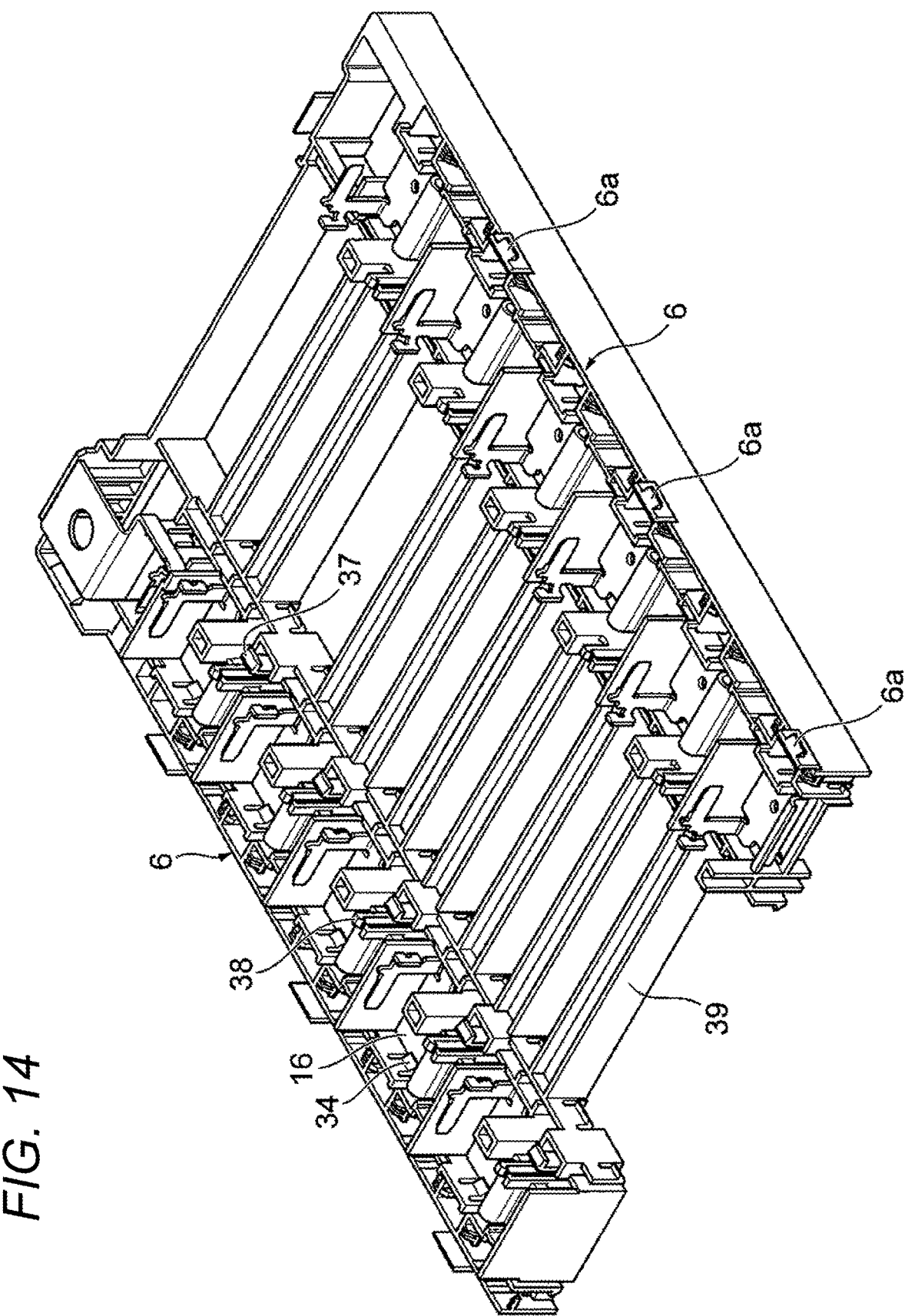
FIG. 14 is a perspective view illustrating another example of a bus bar holder.

FIGS. 13 and 14 are perspective views illustrating other examples of the bus bar holder. In the above examples, an example of the bus bar holders 6 and the gas exhaust duct 7 which are separately configured has been described, but the bus bar holders 6 and the gas exhaust duct 7 may be integrally molded, as illustrated in FIG. 13. The integral molding thereof can reduce the number of components to reduce the assemblyman-hour, and the production cost can be reduced.

When the bus bar holders 6 and the gas exhaust duct 7 are integrally configured, for example, when the bus bar holders 6 and the gas exhaust duct 7 are made of the same synthetic resin material, a synthetic resin having a relatively high elastic modulus needs to be used for elasticity of the locking portions, but when the synthetic resin has a low heat resistance, heat resistance requirement of the gas exhaust duct 7 may not be satisfied. Accordingly, in such a case, a metal film may be applied on the inside of the gas exhaust duct 7 to secure heat resistance.

Furthermore, in the above examples, a configuration in which the bus bar holder 6 on one side in the cell width direction and the bus bar holder 6 on the other side in the cell width direction which are separately provided has been described, but the bus bar holders 6 may be integrally configured by connecting a pair of the bus bar holders 6 by a plurality of ribs 39 extending in the cell width direction, as illustrated in FIG. 14. The integrally configuration can reduce the number of components to reduce the assembly man-hour, and the production cost can be reduced. Note that, although not particularly illustrated, in such a configuration, the gas exhaust duct 7 is arranged above the ribs 39.

The embodiments of the present invention have been described above in detail, but the present invention is not limited to the embodiments described above, and various changes and alterations in design may be made without departing from the scope and spirit of the present invention described in the appended claims. For example, the above embodiments is described in detail for easy description of the present invention, and is not necessarily limited to all the configurations described above. Furthermore, part of a configuration of an embodiment can be replaced with a configuration of another embodiment, and a configuration of an embodiment can be added to a configuration of another embodiment. Still furthermore, for part of the configurations of the respective embodiments, additions, eliminations, or substitutions of another configuration may be made.

REFERENCE SIGNS LIST

1 battery module
2 battery cell
3 battery cell stack
6 bus bar holder
7 gas exhaust duct
8 circuit board
11 battery container
12 battery lid (one side)
13A positive electrode external terminal (external terminal)
13B negative electrode external terminal (external terminal)
14 gas exhaust valve
16 bus bar
21 cell holder
26 bus bar holder locking portion (first claw-shaped locking portion)
27 duct locking portion (third claw-shaped locking portion)
32 cell holder locking portion (second claw-shaped locking portion)

37 circuit board locking portion (fifth claw-shaped locking portion)

42 cell holder locking portion (fourth claw-shaped locking portion)

The invention claimed is:

1. A battery module including a plurality of battery cells, the battery cells each having a rectangular battery container and external terminals provided on one surface of the respective battery container, and a bus bar for conductively connecting adjacent ones of the external terminals, the battery module comprising:
    a cell holder interposed between the battery cells configured to hold the plurality of battery cells;
    a bus bar holder mounted to the cell holder configured to hold the bus bar;
    a gas exhaust duct arranged opposite to a gas exhaust valve provided on one surface of one of the battery cells,
    wherein the cell holder is provided with a first claw-shaped locking portion, the bus bar holder is provided with a second claw-shaped locking portion, and the first and second claw-shaped locking portions are locked to each other,
    the cell holder is further provided with a third claw-shaped locking portion integrally formed with the first claw-shaped locking portion, and
    the gas exhaust duct is provided with a fourth claw-shaped locking portion locked to the third claw-shaped locking portion.

2. The battery module according to claim 1, wherein
    the first claw-shaped locking portion includes pairs of the first claw-shaped locking portions separately provided in a cell width direction of each battery cell, and having hook shapes projecting in approaching directions, and
    the second claw-shaped locking portion includes a pair of the second claw-shaped locking portions separately provided in a cell width direction of the battery cell, and having hook shapes projecting in separating directions.

3. The battery module according to claim 2, wherein
    the third claw-shaped locking portion includes a pair of the first claw-shaped locking portions separately provided in a cell width direction of each battery cell, and having hook shapes projecting in approaching directions, and
    the fourth claw-shaped locking portion includes a pair of the second claw-shaped locking portions separately provided in a cell width direction of the battery cell, and having hook shapes projecting in separating directions.

4. The battery module according to claim 3, wherein
    a circuit board is arranged above the gas exhaust duct, and the circuit board is locked to the bus bar holder by a fifth claw-shaped locking portion provided at the bus bar holder.

5. The battery module according to claim 4, wherein
    two bus bar holders are separately provided on one side and the other side of each of the battery cells in a cell width direction,
    the gas exhaust duct is arranged between one bus bar holder and the other bus bar holder, and
    the circuit board is arranged above the gas exhaust duct, and having both side ends in a cell width direction locked by the fifth claw-shaped locking portion provided at the one bus bar holder, and the fifth claw-shaped locking portion provided at the other bus bar holder.

6. The battery module according to claim 5, wherein
    the fifth claw-shaped locking portion has a hook shape projecting from an inner end of the bus bar holder in a cell width direction.

7. The battery module according to claim 1, wherein
    the bus bar holder has a clearance on an upper surface or a lower surface of the bus bar to house the bus bar.

8. The battery module according to claim 1, wherein
    the bus bar holder and the gas exhaust duct are integrally formed.

9. A battery module including a plurality of battery cells, the battery cells each having a rectangular battery container and external terminals provided on one surface of the respective battery container, and a bus bar for conductively connecting adjacent ones of the external terminals, the battery module comprising:
    a cell holder interposed between the battery cells configured to hold the plurality of battery cells; and
    a bus bar holder mounted to the cell holder configured to hold the bus bar,
    wherein the cell holder is provided with a first claw-shaped locking portion, the bus bar holder is provided with a second claw-shaped locking portion, and the first and second claw-shaped locking portions are locked to each other, and
    the bus bar holder is formed of a material larger in elastic modulus than that of the cell holder.

* * * * *